United States Patent [19]

Fujimoto et al.

[11] Patent Number: 5,368,916
[45] Date of Patent: Nov. 29, 1994

[54] LAMINATED VIBRATION-DAMPING MATERIAL

[75] Inventors: Jun Fujimoto; Tetsuya Tamura, both of Tokyo; Toshikazu Furihata, Chiba; Youhei Suzuki, Chiba; Kakutaro Kauchi, Chiba, all of Japan

[73] Assignee: NEC Corporation, Tokyo, Japan

[21] Appl. No.: 865,028

[22] Filed: Apr. 7, 1992

[30] Foreign Application Priority Data

Apr. 8, 1991 [JP] Japan ............... 3-075059

[51] Int. Cl.$^5$ ............... B32B 27/00; F16F 15/02
[52] U.S. Cl. ............... 428/215; 428/414; 428/423.5; 428/423.7; 428/473.5; 428/518; 428/494
[58] Field of Search ............... 428/215, 494, 518, 414, 428/423.5, 423.7, 473.5

[56] References Cited

U.S. PATENT DOCUMENTS 4,442,167 4/1984 Iwasa et al. ............... 428/494 X

FOREIGN PATENT DOCUMENTS 52-39723 3/1977 Japan .
57-29702 2/1982 Japan .
58-28034 2/1983 Japan .

Primary Examiner—P. C. Sluby
Attorney, Agent, or Firm—Burns, Doane, Swecker & Mathis

[57] ABSTRACT

A laminated damping material comprises a layer of a thermosetting resin having vibration-damping properties as a core layer and two heat resistant films adhesive to the core layer, the core layer being sandwiched between these two heat resistant films. The damping material can be used for preparing a fiber-reinforced composite material which comprises at least one basic layer structure, outer layer/intermediate layer/core layer/intermediate layer/outer layer, the intermediate layer being formed from a heat resistant film having good adhesive properties to both outer and core layers and the core layer being formed from a thermosetting resin. The fiber-reinforced composite material exhibits high vibration-damping properties and accordingly can suitably be used, as a structural material, for the production of not only cars and equipments for leisure time amusement but also space structures such as artificial satellites and air planes.

21 Claims, 2 Drawing Sheets

LAMINATED VIBRATION-DAMPING MATERIAL

BACKGROUND OF THE INVENTION

1. Field of the Invention

The present invention relates to a structural material for relieving or relaxing vibrations and impact of a structure or noises from the structure, and more specifically to a vibration-damping material and a fiber-reinforced composite material for absorbing vibrational energy generated during the operation of structures such as space structures, e.g., artificial satellites, office automation (OA) machinery and tools, various cars or equipments for leisure time amusement as well as a method for the preparation thereof. 2. Prior Art Asphalt-based damping materials have been well-known and used for absorbing vibrational energy of buildings and cars. See, for instance, Japanese Unexamined Patent Publication Nos. Sho 57-29702, Sho 58-28034 and Sho 52-39723.

However, structures whose operation is accompanied by vibration have been diversified and the problem of vibration encountered in space structures such as artificial satellites and a variety of OA machinery and tools can not be used with conventional asphalt-based damping materials which give out a peculiar smell. Therefore, it has been desired to develop a damping material which can be preferably used even in structures operated within a closed spaces or in the vicinity of operators.

On the other hand, fiber-reinforced composite materials obtained by solidifying inorganic fibers such as carbon fibers and glass fibers and organic fibers such as aramid fibers as reinforcing fibers with a matrix resin such as an epoxy, polyimide or polyether ether ketone resin are lightweight and have high strength compared with the conventional metallic structural materials. In addition, desired mechanical properties can be imparted to these composite material by controlling the angle of orientation of these fibers. For this reason, these composite materials have been widely used for the production of various structural materials such as those for space structures, air planes and a variety of cars such as automobiles as well as equipment for leisure time amusement.

However, the fiber-reinforced composite materials are lightweight and low vibration-damping properties (for instance, a loss factor $\eta$ ranging from 0.001 to 0.01) approximately equal to that of the conventional metallic structural materials and accordingly the composite material easily cause vibrations. Therefore, these composite materials as such are insufficient and unacceptable for optimum use in the foregoing applications in which the quality is adversely affected by vibration, since the structures obtained from these composite materials vibrate with large amplitudes during operation thereof. Moreover, structures used in such applications are often produced through a one-piece molding method and accordingly the vibration damping (structural damping) due to friction at joined portions cannot be anticipated unlike the metallic structural materials. For this reason, the space structures such as artificial satellites suffer from various problems such as troubles of machinery and tools mounted thereon due to vibrations of the structures and a reduction of precision in positioning antennas. Consequently, these composite materials are not preferably used as structural materials for these applications. It has thus become a quite important problem in this field to impart vibration-damping properties to these fiber-reinforced composite materials.

To solve these problems, there has been investigated a method for improving the vibration-damping properties of composite materials through the improvement of vibration-damping properties of matrix resins used therein.

For instance, there has been proposed a method for improving vibration-damping properties which comprises sandwiching a film of a damping material, i.e., a resin exhibiting a high mechanical loss between two layers of a material obtained by impregnating reinforcing fibers with a matrix resin to give a multilayer structure.

As the foregoing vibration damping materials in the form of films, there have been used films mainly comprising thermoplastic resins such as polyolefins. However, it is difficult to obtain a large angle of energy loss (tan $\delta$) through the use of a thermoplastic vibration damping film and it is likewise difficult to select the ingredient so that the temperature which provides a maximum value of the tan $\delta$ falling within the temperature range at which each structure is put into practical use. For this reason, there has been a need for the development of thermoplastic vibration damping films which can provide a large angle of energy loss (tan $\delta$) and whose temperature capable of providing a maximum value of the tan $\delta$ is relatively easily be controlled.

It has, however, been confirmed that the foregoing method cannot provide any composite material having desired damping properties when both matrix and damping materials comprise thermoplastic resins. While not wanting to be bound by any particular theory, this is believed to be due to the following reasons.

The fiber-reinforced composite materials are in general used at a temperature ranging from $-35°$ C. to $35°$ C. and accordingly a vibration damping material to be sandwiched is selected from those exhibiting high vibration-damping properties within the temperature range defined above.

The maximum angle of energy loss (tan $\delta$) serving as an index of the vibration-damping properties of the composite materials is usually observed at the glass transition temperature (Tg) of a damping material used and thus it is preferred to use a damping material having a glass transition temperature falling within the range defined above.

On the other hand, the fiber-reinforced composite material per se must have excellent mechanical properties and as a result, preferably used are those having high strength and elastic modulus. Accordingly, materials having high glass transition points are necessarily used as matrix materials.

Upon preparing a fiber-reinforced composite material having excellent vibration-damping properties from matrix materials and damping materials which satisfy the requirements discussed above and which are both thermoplastic resins, these resins are intermingled during pressure molding with heating (during hardening). This leads to a shift of the glass transition point of the damping material towards the high temperature side and correspondingly desired vibration-damping properties cannot be ensured. Under these circumstances, an attempt has been made to eliminate these drawbacks by first completely hardening the damping material, then laminating the damping material with a matrix and pressure-molding the laminate under heating. However, this method likewise suffers from the foregoing problems and any damping material having desired properties is not obtained.

It would be assumed that the foregoing problems arise due to the diffusion of the matrix resin in the damping material although the glass transition point of the damping material is set to a level adjacent to room temperature and the damping material is completely hardened in advance.

SUMMARY OF THE INVENTION

An object of the present invention is generally to solve the foregoing problems associated with the conventional methods and more specifically to provide a laminated damping material which comprises a fiber-reinforced composite material formed from thermosetting resins and which has high damping properties.

Another object of the present invention is to provide a fiber-reinforced composite material exhibiting high vibration-damping properties which can effectively be used in wide variety of applications.

A further object of the present invention is to provide a method for preparing the foregoing fiber-reinforced composite material.

According to an aspect of the present invention, there is provided a laminated damping material which comprises a layer of a thermosetting resin having vibration-damping properties as a core layer and two heat resistant films adhesive to the core layer, the core layer being sandwiched between these two heat resistant films.

According to another aspect of the present invention, there is provided a fiber-reinforced composite material which comprises at least one basic layer structure, outer layer/intermediate layer/core layer/intermediate layer/outer layer, the intermediate layer being formed from a heat resistant film having good adhesive properties to both outer and core layers and the core layer being formed from a thermosetting resin.

According to a further aspect of the present invention, there is provided a method for preparing a fiber-reinforced composite material which comprises the steps of impregnating reinforcing fiber with a matrix resin, semihardening the matrix resin to form a prepreg, laminating the prepreg with the foregoing laminated damping material and pressing and heating the resulting laminate to harden and integrate it.

DESCRIPTION OF THE PREFERRED EMBODIMENTS

Figure 1:
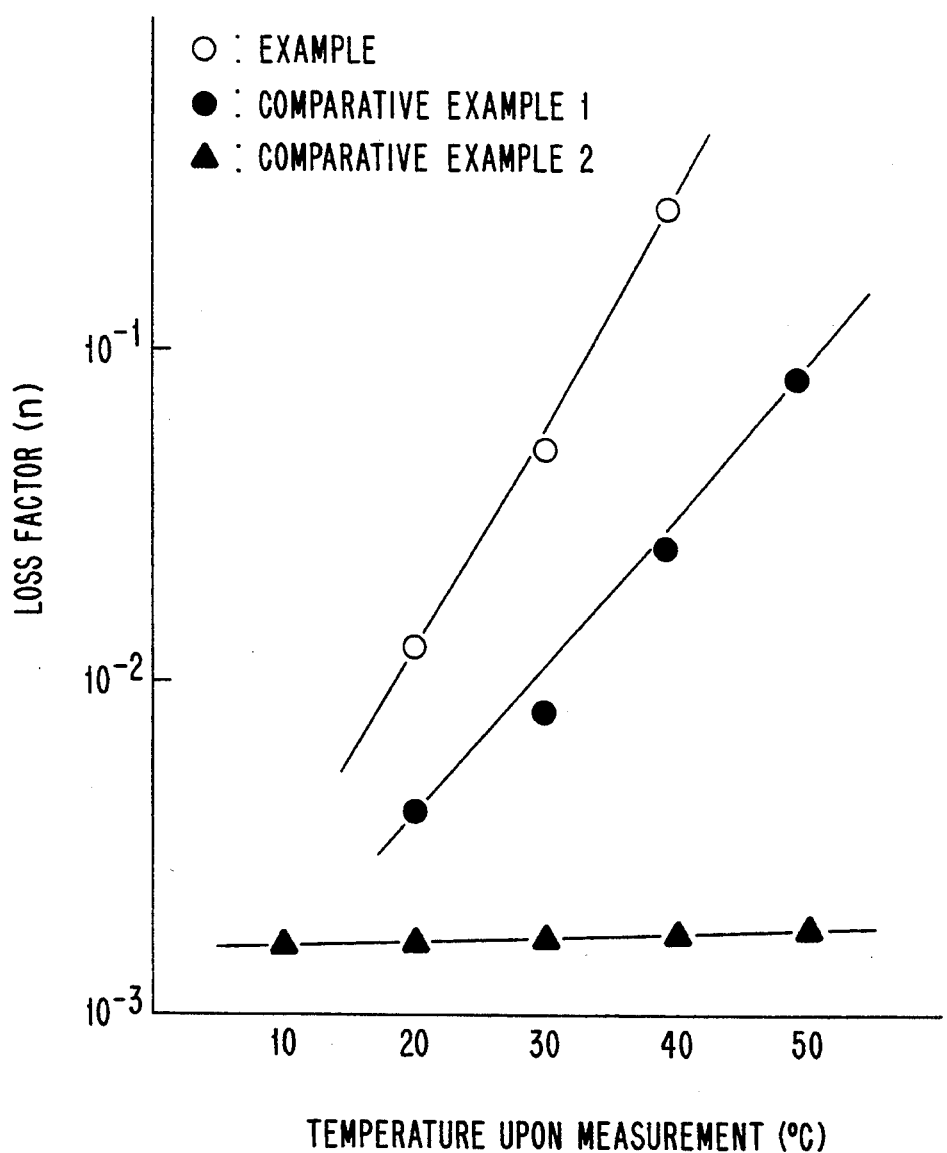
FIG. 1 is a graph on which energy loss factors ($\eta$) of the damping materials obtained in Example and Comparative Examples 1 and 2 are plotted as functions of temperature.

The fiber-reinforced composite material according to the present invention has such an important feature that a heat resistant film is inserted between an outer layer of a matrix resin and a core layer in order to prevent the interdiffusion of the matrix resin and the thermosetting resin of the core layer during pressing and heating (hardening). Thus, a fiber-reinforced composite material exhibiting predetermined vibration-damping properties can easily be prepared by the use of a laminate having the foregoing layer structure as the damping material. In other words, the composite material of the present invention has a basic layer structure composed of outer layer/intermediate layer/core layer/intermediate layer/outer layer.

Outer Layer

The outer layer of the fiber-reinforced composite material according to the present invention comprises a fiber-reinforced matrix resin. The matrix resin is a thermosetting resin having high strength and high elastic modulus. Specific examples thereof are epoxy resins, phenol resins, unsaturated polyester resins, diallylphthalate resins, addition type polyimide resins and cyanate resins. The reinforcing fibers are impregnated with these resins per se or in the form of varnishes obtained by dissolving them in proper solvents and then dried to give semi-hardened prepregs which is used for the preparation of the fiber-reinforced composite material.

The term "reinforcing fiber" herein used means fibers exhibiting high strength and high elastic modulus like the matrix resin explained above and includes, for instance, carbon fiber, glass fiber, alumina fiber, silicon carbide fiber, aramid fiber and highly oriented polyethylene fiber. These fibers may be used in any form such as unidirectionally oriented fibers, textile fabrics (for instance, plain weave fabrics, twill fabrics and satin weave fabrics), short fibers and mat-like fabrics or nonwoven fabrics in which short fibers are interlocked together.

Intermediate Layer

The intermediate layer of the fiber-reinforced composite material according to the present invention is formed from a heat resistant film having good adhesive properties to both the outer and core layers as will be detailed below. Preferably, the heat resistant film is preferably those exhibiting very low degree of deformation even if it is pressed and heated and has good resistance to chemicals so that it is not attacked by both of the ingredients for the outer layer and the core layer. Examples of films which satisfy these requirements include polyamide films, polyester films, polyimide films poly(parabanic acid) films, polyetherimide films, polyphenylene sulfide films, polyether sulfone films, polyether ether ketone films and fluoroplastic films.

The film used as an intermediate layer serves to prevent intermingling and interdiffusion of the components constituting the outer and core layers. The thickness thereof is preferably as thin as possible so far as the foregoing functions can be ensured. If the thickness thereof is excessively thick, the mechanical strength of the resulting fiber-reinforced composite material is lowered. For this reason, the intermediate layer preferably has a thickness ranging from about 5 to 50 $\mu$m.

The surface of the film may be subjected to a pretreatment such as a chemical treatment with an acid or alkali, a plasma treatment, a corona discharge treatment, blasting or a combination thereof for the purpose of improving or enhancing the adhesive strength and reliability of the film and hence the final composite material. In particular, a fluoroplastic film which does not exhibit adhesive properties at all must be pretreated with, for instance, a sodium/naphthal ene/tetrahydrofuran solution.

Core Layer

The core layer of the fiber-reinforced composite material of the present invention is formed from a thermosetting resin. The thermosetting resin is in general selected or designed in such a manner that the glass transition temperature thereof after curing ranges from −35° to 35° C. In addition, preferred are those having angles of energy loss (tan δ) as determined at the glass transition temperature as large as possible. The angle of energy loss is in general not less than 0.8 in the present invention. Examples of the thermosetting resins which satisfy the aforementioned requirements are epoxy resins, polyurethane resins, polyurea resins and adhesive silicone resins. These thermosetting resins as materials for the core layer may further comprise rubbery or resinous substances such as nitrile rubber, polyvinyl chloride resin, polyvinylidene chloride resin, acrylic rubber, silicone rubber and/or chlorohydrin rubber in order to adjust the glass transition point of the resulting core layer and to improve and enhance the adhesive properties or the angle of energy loss.

These thermosetting resins may be formed into a sheet and then sandwiched between the foregoing heat resistant films serving as the intermediate layers. Alternatively, they may be applied onto one of the films serving as the intermediate layer and then the other film may be put on the top of the coated film. The resulting sandwich-like assembly may be in the uncured state or may be semi-cured or completely cured prior to the lamination with the matrix resin layers serving as the outer layers. The core layer preferably has a thickness ranging from about 10 to 500 μm. This is because if it is too thin, the vibration-damping properties thereof are impaired while if it is too thick, the mechanical strength of the resulting fiber-reinforced composite material is lowered.

The outer, intermediate and core layers may optionally comprise a filler such as silica, alumina, talc, calcium carbonate, mica, clay, carbon black, graphite, calcium silicate, titanium oxide, aluminum hydroxide and/or barite in an amount which does not adversely affect the desired properties of the resulting composite material.

After laminating these 5 layers into the foregoing layer structure comprising outer layer/intermediate layer/core layer/intermediate layer/outer layer, the laminate is contact bonded through pressing and heating in a press or an autoclave to give an intended fiber-reinforced composite material (unit composite material).

Two or more such unit composite materials can further be laminated with each other to give a laminate comprising a plurality of these units.

The present invention will hereinafter be explained in more detail with reference to the following non-limitative working Examples and the effects practically accomplished by the present invention will also be discussed in detail in comparison with Comparative Examples.

Preparation and Evaluation of Core Layer

There were sufficiently mixed and degassed 100.0 g of neopentyl glycol diglycidyl ether (trade name: DINACOL Ex-211; epoxy equivalent 140; viscosity 12 cps at 25° C., available from Nagai Chemical Industry Co., Ltd.) as an epoxy resin and 71.4 g of polyamidoamine (trade name: EPOMIC Q-655; active hydrogen equivalent 100; viscosity 750 cps at 25° C., available from Mitsui Petrochemical Industries, Ltd.) and then the resulting mixture was applied onto a Teflon sheet so that the thickness thereof was 250 μm. The layer applied was pre-cured at room temperature for 24 hours and then sufficiently cured under heating at 80° C. for 2 hours.

The cured product peeled off from the Teflon sheet was analyzed by Viscoelastic Spectrometer (frequency 10 Hz). The maximum angle of energy loss (tan δ) of the product was found to be 1.58 which was obtained at a temperature of 25° C. (which corresponds to the glass transition point thereof).

EXAMPLE

The foregoing mixture of DINACOL Ex-211/EPOMIC Q-655 (weight ratio 100.0/71.4) was applied onto a 6,6-nylon film having a thickness of 15 μm in a thickness of 250 μm, then another 6,6-nylon film identical to that used above was put on the top of the coating layer while paying attention to avoid air bubbles from coming into the interface therebetween and the laminate was cured at room temperature for 24 hours and then at 80° C. for 2 hours. Subsequently, four plies each of UD prepregs (trade name: T-800; available from Toray Industries, Inc.) obtained by orienting carbon fibers in one direction and then impregnating the fibers with an epoxy resin were put on the top and bottom of the foregoing cured product and the resulting laminate was cured by heating and pressing for 3 hours in an autoclave (temperature 120° C.; pressure 5 kgf/cm2). The vibration-damping properties of the resulting composite material were evaluated in terms of the loss factor thereof (η) instead of the angle of energy loss because of the complicated layer structure of the composite material.

The results thus obtained are plotted on FIG. 1 (◎). The results plotted on FIG. 1 clearly indicate that the fiber-reinforced composite material according to the present invention exhibits a very high loss factor (η).

An example of the thermosetting damping material is exemplified in this Example, but composite materials exhibiting a higher loss factor around room temperature can be obtained by adjusting the glass transition point of the materials used. For instance, the value (η) of 0.2 (at 20° C.) could be obtained by the use of a cured product of aliphatic epoxy resin/acid anhydride curing agent having the maximum tan δ of 1.35 at 10° C.

COMPARATIVE EXAMPLE 1

Using the cured product described above in connection with the item "Preparation and Evaluation of Core Layer", a composite material was prepared in the same manner used in Example 1 except that the material was free of 6,6-nylon films (heat resistant film) and the loss factor thereof was determined. The results obtained are plotted on FIG. 1 (●). The results indicate that the loss factor (η) is substantially shifted towards the high temperature side compared with the results obtained in Example 1.

COMPARATIVE EXAMPLE 2

A composite material was prepared only from the foregoing UD prepreg without using the layer structure comprising intermediate layer/core layer/intermediate layer and the loss factor thereof was determined in the same manner used in Example 1. The results obtained are plotted on FIG. 1 (▲). In this case, there is not observed any temperature dependency in the loss factor and it is found that the loss factor is very low and almost constant (0.002).

Figure 2:
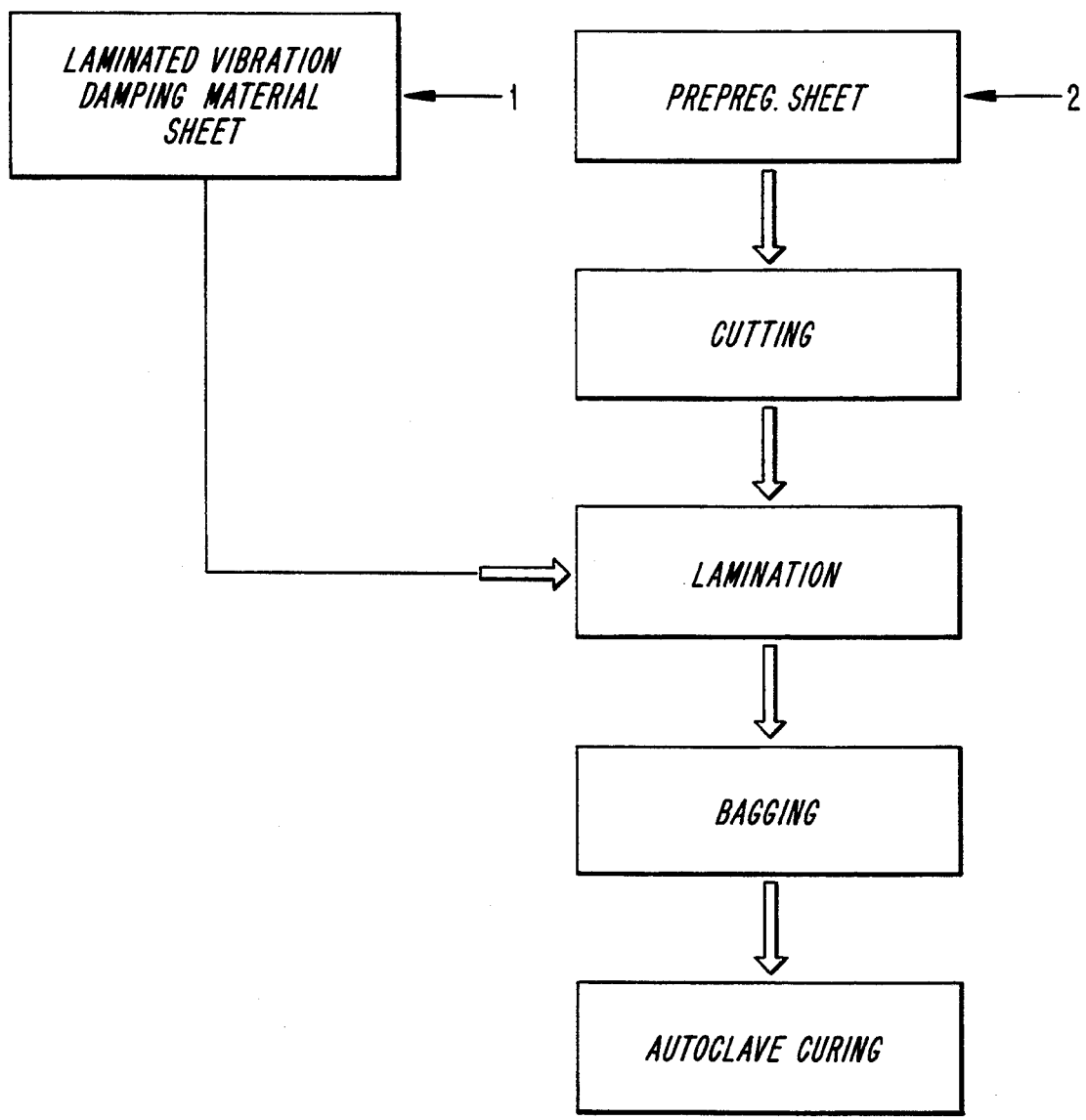
FIG. 2 is a flow diagram for explaining the method for preparing the fiber-reinforced composite material according to the present invention.

FIG. 2 is a flow diagram for explaining the method for preparing the fiber-reinforced composite material according to the present invention.

As shown in FIG. 2, a prepreg sheet 2 is cut while taking into consideration the size and shape of a part to be formed. The prepreg sheet 2 and the laminated damping film 1 of the present invention are put in layers in a predetermined order. A release film and/or a press sheet are put on the resulting laminate and the ensemble is covered with a vacuum-package (bagging process). Then the structure is introduced into an autoclave and heated under pressure to cause curing to give a desired composite material of the present invention.

In the laminated damping material of the present invention, heat resistant films having a high elastic modulus and smooth surfaces are used as surface layers. Thus, the present invention makes it possible to substantially eliminate the problems of impairment in the workability such as insufficient tackiness between the film and the prepreg sheet and incomplete adhesion between them due to the plastic deformation of the damping material observed during the lamination, which are encountered with the conventional thermoplastic films.

The fiber-reinforced composite material according to the present invention exhibits high vibration-damping properties and accordingly can suitably be used, as a structural material, for the production of not only cars and equipments for leisure time amusement but also space structures such as artificial satellites and air planes.

What is claimed is:

1. A laminated vibration damping material comprising a layer of a thermosetting resin as a core layer, and a first and a second heat resistant film adhesive to the core layer, the core layer being sandwiched between the first and second heat resistant films.

2. The laminated damping material according to claim 1 wherein the heat resistant films are a member selected from the group consisting of polyamide, polyester, polyimide, poly(parabanic acid), polyetherimide, plyphenylene sulfide, polyether sulfone, polyether ether ketone and fluoroplastic resin films.

3. The laminated damping material according to claim 1 wherein the heat resistant films have a thickness ranging from 5 to 50 μm.

4. The laminated damping material according to claim 1 wherein both surfaces of each of the heat resistant films are subject to a pretreatment.

5. The laminated damping material according to claim 4 wherein the pretreatment is a chemical treatment, plasma treatment, corona discharge treatment, blasting or a combination thereof.

6. The laminated damping material according to claim 1 wherein the core layer has a glass transition point after curing ranging from −35° to 35° C.

7. The laminated damping material according to claim 6 wherein the core layer has an angle of energy loss, as determined at the glass transition point, of not less than 0.8.

8. The laminated damping material according to claim 1 wherein the core layer has a thickness ranging from 10 to 500 μm.

9. The laminated damping material according to claim 1, wherein said thermosetting resin has a glass transition point after curing ranging from −35° to 35° C. and an angle of energy loss, as determined at the glass transition point of not less than 0.8.

10. The laminated damping material according to claim 9, wherein said thermosetting resin is a member selected from the group consisting of epoxy resins, polyurethane resins, polyurea resins and adhesive silicone resins.

11. A fiber-reinforced composite material comprising at least one basic layer structure, outer layer/intermediate layer/core layer/intermediate layer/outer layer, the intermediate layer being formed from a heat resistant film having adhesive properties to both outer and core layers, the core layer being formed from a thermosetting resin and the outer layer being formed from a fiber-reinforced matrix resin.

12. The fiber-reinforced composite material according to claim 11 wherein the heat resistant film is a member selected from the group consisting of polyamide, polyester, polyimide, poly(parabanic acid), polyetherimide, polyphenylene sulfide, polyether sulfone, polyether ether ketone and fluoroplastic resin films.

13. The fiber-reinforced composite material according to claim 11 wherein the heat resistant film has a thickness ranging from 5 to 50 μm.

14. The fiber-reinforced composite material according to claim 11 wherein both surfaces of the heat resistant film are subjected to a pretreatment.

15. The fiber-reinforced composite material according to claim 14 wherein the pretreatment is selected from a chemical treatment, plasma treatment, corona discharge treatment, blasting or a combination thereof.

16. The fiber-reinforced composite material according to claim 11 wherein the core layer has a glass transition point after curing ranging from −35° to 35° C.

17. The fiber-reinforced composite material according to claim 16 wherein the core layer has an angle of energy loss, as determined at the glass transition point, of not less than 0.8.

18. The fiber-reinforced composite material according to claim 11 wherein the core layer comprises a material selected from the group consisting of nitrile rubber, polyvinyl chloride resin, polyvinylidene chloride resin, acrylic rubber, silicone rubber and chlorohydrin rubber.

19. The fiber-reinforced composite material according to claim 11 wherein the core layer has a thickness ranging from 10 to 500 μm.

20. The fiber-reinforced composite material according to claim 11, wherein said thermosetting resin has a glass transition point after curing ranging from −35° to 35° C. and an angle of energy loss, as determined at the glass transition point of not less than 0.8.

21. The fiber-reinforced composite material according to claim 20, wherein said thermosetting resin is a member selected from the group consisting of epoxy resins, polyurethane resins, polyurea resins and adhesive silicone resins.

* * * * *